United States Patent [19]

Conroy

[11] 4,084,450
[45] Apr. 18, 1978

[54] THRUST WASHER ARRANGEMENT FOR DIFFERENTIALS

[75] Inventor: William E. Conroy, Aurora, Ill.
[73] Assignee: Caterpillar Tractor Co., Peoria, Ill.
[21] Appl. No.: 727,190
[22] Filed: Sep. 27, 1976
[51] Int. Cl.² ............................................. F16H 1/40
[52] U.S. Cl. ......................................... 74/713; 74/710
[58] Field of Search ................ 74/710, 713, 710.5, 74/711

[56] References Cited
U.S. PATENT DOCUMENTS

| 1,445,865 | 2/1923 | Alden | 74/713 |
| 1,610,739 | 12/1926 | Britton | 74/713 |
| 2,702,487 | 2/1955 | Adams | 74/711 |
| 2,873,622 | 2/1959 | Nash | 74/711 |
| 2,966,076 | 12/1960 | O'Brien | 74/710.5 |
| 3,304,806 | 2/1967 | Adams | 74/711 |
| 3,874,251 | 4/1975 | Lapitsky et al. | 74/713 |
| 4,037,492 | 7/1977 | Ashauer et al. | 74/713 X |

Primary Examiner—Samuel Scott
Assistant Examiner—Lance W. Chandler
Attorney, Agent, or Firm—Phillips, Moore, Weissenberger, Lempio & Majestic

[57] ABSTRACT

A differential comprises a housing having a spider mounted therein and four pinion gears rotatably mounted on stub shafts of the spider in a conventional manner. A semi-spherically shaped thrust washer is disposed between an outboard side of each of the pinion gears and the housing and has an elongated slot formed therethrough and disposed entirely within the confines of the thrust washer. A pin is secured to the housing and extends into the slot to anchor the thrust washer relative to the housing.

7 Claims, 4 Drawing Figures

4,084,450

THRUST WASHER ARRANGEMENT FOR DIFFERENTIALS

BACKGROUND OF THE INVENTION

A conventional differential normally comprises a pair of axially opposed face gears each secured to an axle shaft. A spider is disposed in a housing of the differential and has four stub shafts projecting radially outwardly therefrom. A pinion gear is rotatably mounted on each of the stub shafts and meshes between the face gears. A recurring problem in such differentials is one of fully compensating for thrust loads imposed on the pinion gears during operation of the differential.

To this end, a semi-spherically shaped thrust washer is normally disposed between an outboard side of each pinion gear and the housing to compensate for such thrust loads. The thrust washer is normally solely anchored to prevent rotation thereof, by a pin secured to the housing which extends into a slot formed through the thrust washer. The slot, which extends to the edge of the thrust washer to facilitate assembly, gives rise to fatigue and related problems.

SUMMARY OF THIS INVENTION

An object of this invention is to provide an improved thrust bearing arrangement for each pinion gear of a differential which exhibits a high degree of structural integrity and longer life potential than conventional thrust washers. Another object of this invention is to provide a method for expeditiously and economically assembling the thrust washer in place in the differential.

The differential comprises a housing having a spider mounted therein in a conventional manner. A pinion gear is rotatably mounted on each of the stub shafts of the spider and the thrust washer is disposed between an outboard side of each pinion gear and the housing. A closed and elongated slot is formed through each thrust washer, adjacent to an edge thereof, and a pin is secured to the housing and extends into the slot to prevent the thrust washer from moving relative to the housing.

The method of this invention contemplates assembling a differential having separable first and second parts. The first part of the differential is pre-assembled to comprise a housing part having at least one face gear rotatably mounted thereon and at least one pin secured internally on the housing part to have a free end thereof extend adjacent to the face gear. The second part of the differential is then pre-assembled to comprise at least one pinion gear rotatably mounted on a shaft and thrust washer, having the above-mentioned elongated slot formed therethrough, mounted on the shaft and disposed on an outboard side of the pinion gear. Thereafter, the first and second parts of the differential are assembled together by the steps of first engaging the free end of the pin within the slot formed through the first washer and thereafter engaging the pinion gear with the face gear to move the pinion gear and thrust washer axially outwardly on the shaft towards the pin whereby the free end of the pin is fully entrapped within the slot.

BRIEF DESCRIPTION OF THE DRAWINGS

Other objects of this invention will become apparent from the following description and accompanying drawings wherein.

DETAILED DESCRIPTION

Figure 1:
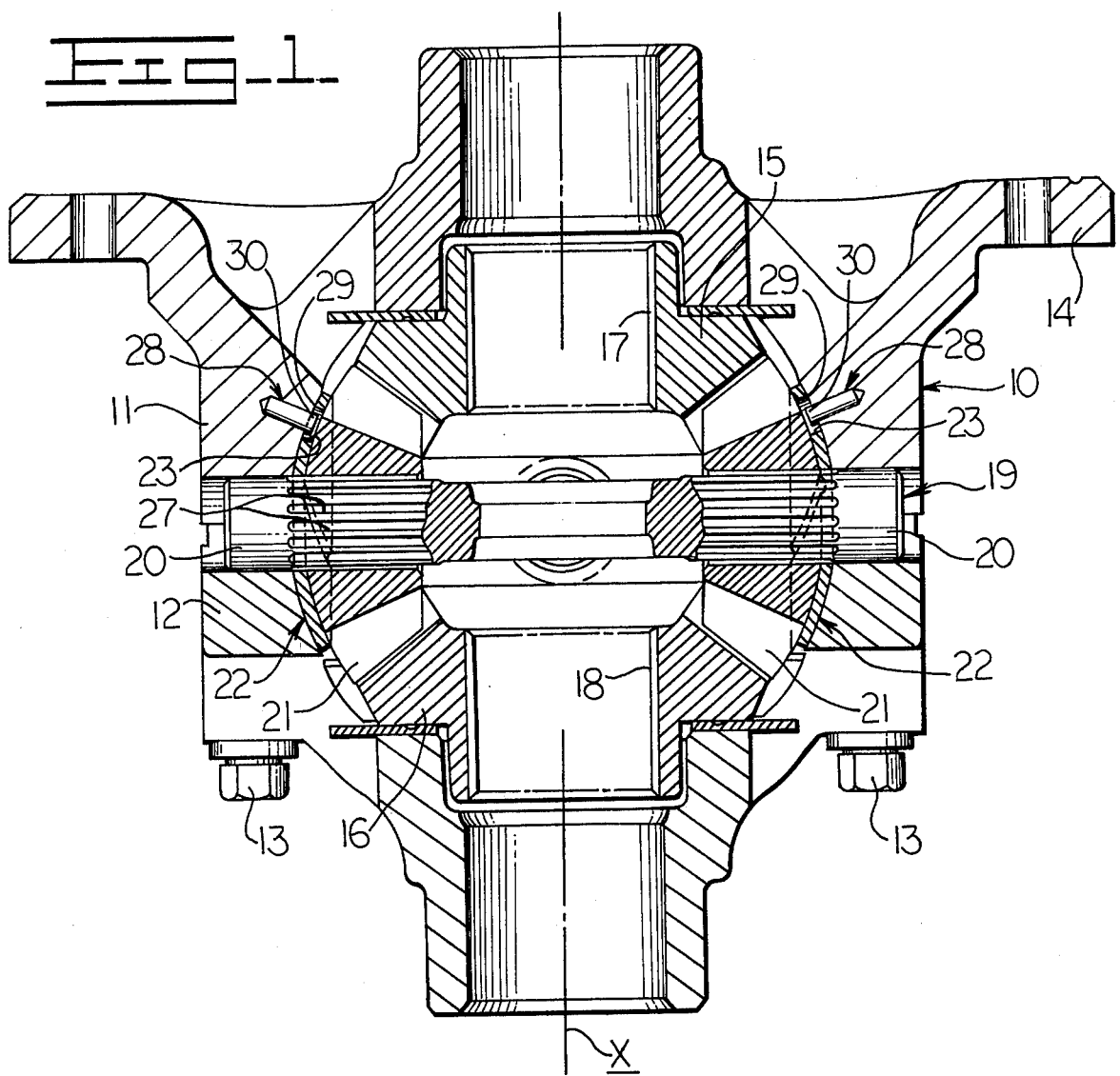
FIG. 1 is a sectional view taken transversely through a differential and having a pair of the thrust washer arrangements of this invention employed therein.

FIG. 1 illustrates a differential comprising a housing 10 including a first housing part 11 secured to a second housing part 12 by a plurality of circumferentially disposed bolts 13. First housing part 11 has a radial flange 14 secured thereon and adapted to have a face gear (not shown) attached thereto to provide the power input from the drive train of a vehicle in a conventional manner. A pair of face gears 15 and 16 are splined internally at 17 and 18, respectively, to adapt them for reception of the drive axles of a vehicle (not shown).

A spider 19 has four stub shafts which extend radially outwardly therefrom, two of which are shown at 20. The pair of stub shafts illustrated are disposed in coaxial relationship whereas the non-illustrated stub shafts are disposed perpendicular to stub shafts 20. Each stub shaft 20 has a pinion gear 21 rotatably mounted thereon which meshes between face gears 15 and 16 in a conventional manner.

Figure 2:
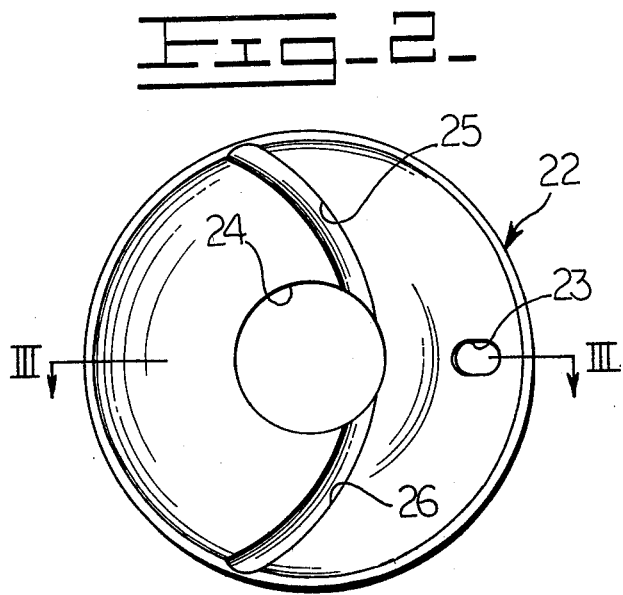
FIG. 2 is a plan view of one of the thrust washers.
Figure 3:
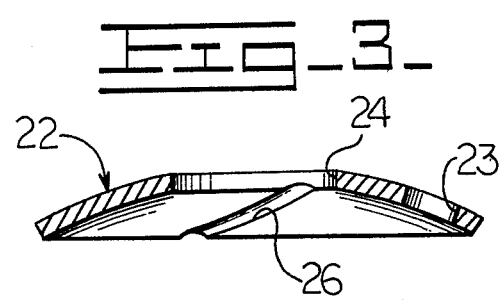
FIG. 3 is a cross sectional view of the thrust washer, taken in the direction of arrows III—III in FIG. 2.

Upon operation of the differential, substantial thrust loads are imposed on pinion gears 21 thus requiring a thrust washer 22 disposed between an outboard side of each pinion gear and the housing. As shown in FIGS. 2 and 3, the thrust washer is semi-spherically shaped and has a closed and elongated slot 23 formed therethrough. A central opening 24 is formed through the thrust washer to adapt it for mounting on a respective stub shaft 20 of spider 19.

The internal bore formed through each pinion gear 21 and circular opening 24 formed through each thrust washer 22 are each slightly larger than the outside diameter of a respective stub shaft 20 to permit the pinion gear and thrust washer to move axially thereon. Although not necessarily required for lubrication pruposes, each thrust washer may have a pair of semi-circular grooves 25 and 26 formed internally thereon to cooperate with a plurality of longitudinally disposed grooves 27 formed externally on each stub shaft 20. Grooves 25, 26 and 27 cooperate to communicate lubricant to the pinion gears and thrust washers. Alternatively and to increase the structural integrity of the washers, grooves 25 and 26 could be placed on the back face of each gear 21 to provide a lube passage to lubricate the pinion gears and thrust washers.

As shown in FIGS. 1-3, slot 23 has a major axis which intersects a center of the thrust washer. The slot is disposed entirely within the confines of the thrust washer and is further disposed adjacent to an edge thereof whereby movement of the thrust washer in any direction relative to housing 10 is prevented. In order to effect such desiderata, a pin 28 has a first end thereof secured to housing part 11 and a second end thereof disposed in slot 23.

It should be noted in FIG. 1 that an edge 29 defining an outer end of each slot 23 is disposed to prevent movement of thrust washer 22 past an end 30 of pin 28, including relative movements thereof in the direction of an axis X which would be the rotational axis of the drive axles of the vehicle. Pin 28 thus fully locks thrust washer 22 in position to prevent movement thereof in any direction relative to housing 10. The method for assembling the differential, including the method steps for disposing pin 28 in slot 23 as shown in FIG. 1, will now be described.

Figure 4:
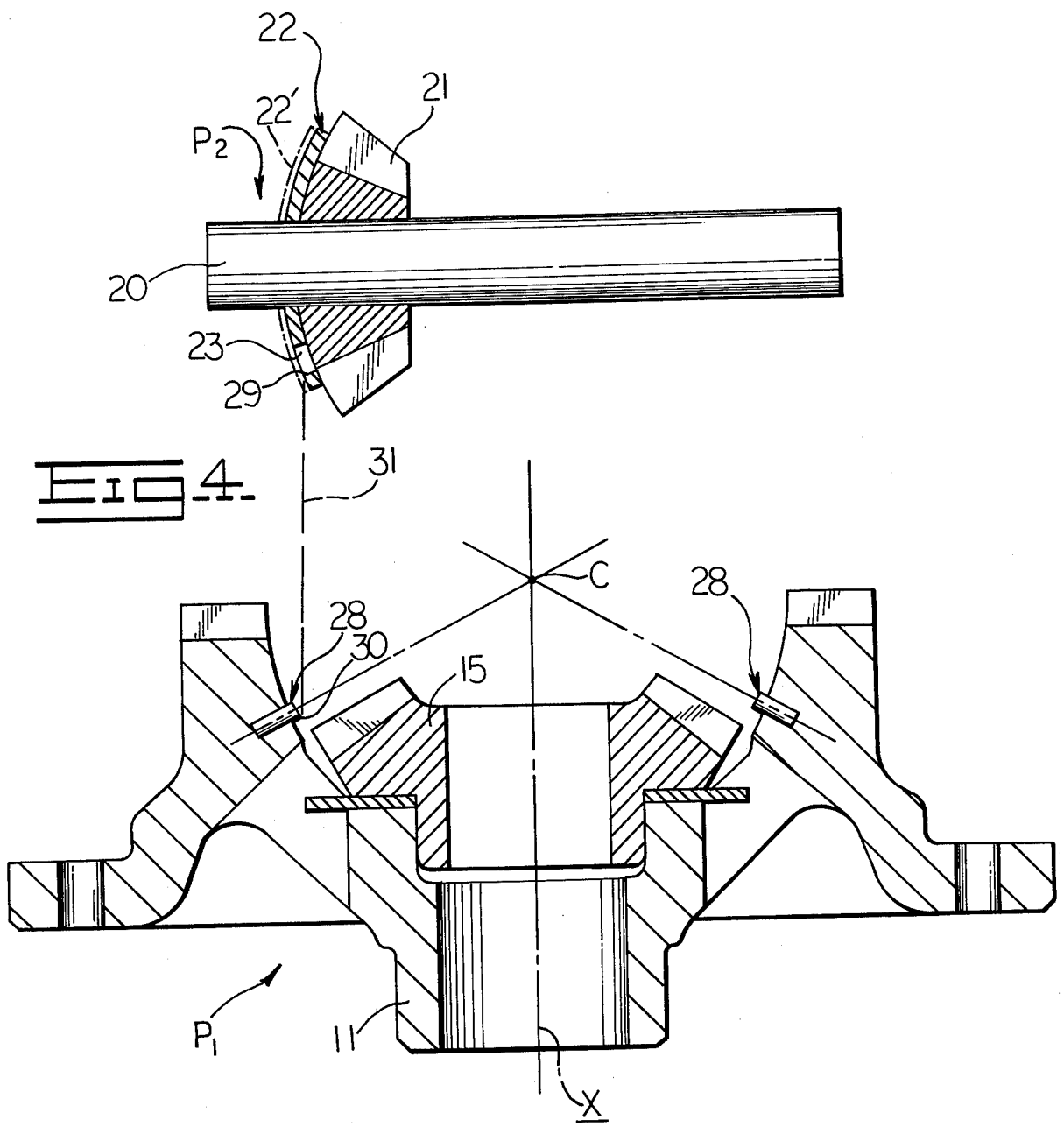
FIG. 4 schematically illustrates method steps employed in assembling first and second parts of the differential together.

FIG. 4 schematically illustrates first and second parts of the differential being assembled together to form the integrated construction illustrated in FIG. 1. For illustration purposes, a first part $P_1$ of the differential may be considered to comprise housing part 11, face gear 15 and pins 28. A second part $P_2$ of the differential may be considered to comprise at least one pinion gear 21, a stub shaft 20 of spider 19 and a thrust washer 22. However, it should be understood that the latter or second part of the differential would normally also include housing part 12, entire spider 19, face gear 15 and remaining pinions 21.

The method for assembling the differential first comprises the step of preassembling first part $P_1$ with the components mentioned above and with each pin 28 secured internally on housing part 11 to have free end 30 thereof extend adjacent to face gear 15. Second part $P_2$ of the differential is pre-assembled and the first and second differential parts are then assembled and secured together by bolts 13 (FIG. 1). Upon such assembly, differential parts $P_1$ and $P_2$ are moved together along axis X to engage free end 30 of pin 28 within slot 23, as indicated by dotted line 31.

Thereafter, pinion gear 21 will engage face gear 15 to move the pinion gear and thrust washer axially outwardly on stub shaft 20 and towards pin 28 whereby the thrust washer will assume its phantom line position 22′, illustrated in FIG. 4. Thus, free end 30 of pin 28 will be fully entrapped within slot 23 of the thrust washer, as illustrated in FIG. 1, to prevent the thrust washer from moving relative to housing 10.

What is claimed is:

1. A differential comprising
a housing,
a spider comprising at least one stub shaft mounted on said housing,
a pinion gear rotatably mounted on said stub shaft,
a thrust washer disposed between an outboard side of said pinion gear and said housing,
means defining a closed and elongated slot through said thrust washer, said slot disposed entirely within the confines of said thrust washer and further disposed adjacent to an edge thereof, and
a pin having a first end thereof secured to said housing and a second end thereof disposed in the slot defined through said thrust washer.

2. The differential of claim 1 wherein said housing comprises a first part having said pin secured thereon and a second part releasably secured to said first part.

3. The differential of claim 2 wherein each of the first and second parts of said housing have a face gear rotatably mounted thereon and wherein said pinion gear is intermeshed between the face gears rotatably mounted on said first and second housing parts.

4. The differential of claim 3 wherein the second end of said pin is disposed within the slot formed through said thrust washer to overlap an edge defining an outer end of said slot.

5. The differential of claim 1 further comprising means defining grooves between said pinion gear and said thrust washer and on said stub shaft adapted to communicate lubricant therethrough.

6. The differential of claim 1 wherein said thrust washer is semi-spherically shaped.

7. The differential of claim 1 wherein said spider has four stub shafts thereon, each of said stub shafts having a said pinion gear rotatably mounted thereon and a thrust washer disposed between an outboard side of each pinion gear and said housing.

* * * * *